US005482752A

United States Patent [19]
Weder

[11] Patent Number: 5,482,752
[45] Date of Patent: Jan. 9, 1996

[54] DECORATIVE MATERIAL HAVING A COLORED STICKY ELEMENT DISPOSED THEREON FORMING AT LEAST A PORTION OF A DECORATION

[75] Inventor: Donald E. Weder, Highland, Ill.

[73] Assignee: Highland Supply Corporation, Highland, Ill.

[21] Appl. No.: 273,061

[22] Filed: Jul. 11, 1994

Related U.S. Application Data

[60] Division of Ser. No. 894,705, Jun. 3, 1992, Pat. No. 5,347,789, which is a continuation-in-part of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, which is a continuation-in-part of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.$^6$ ............................ B32B 3/30; B32B 27/20
[52] U.S. Cl. .................... 428/40; 428/41; 428/224; 428/317.1; 428/317.3; 229/87.06
[58] Field of Search ........................ 229/87.01, 87.06, 229/87.19, 87.04; 47/72, 41.13, 29; 53/397, 413, 461, 465, 399, 411; 428/40, 41, 224, 236, 317.1, 317.3, 317.7

[56] References Cited

U.S. PATENT DOCUMENTS

| 557,526 | 3/1896 | Egge . | |
|---|---|---|---|
| 732,889 | 7/1903 | Paver . | |
| 1,525,015 | 2/1925 | Weeks . | |
| 1,863,216 | 6/1932 | Wordingham . | |
| 1,978,631 | 10/1934 | Herrlinger . | |
| 2,032,386 | 3/1936 | Wood | 229/87.01 |
| 2,048,123 | 7/1936 | Howard | 229/87 |
| 2,170,147 | 8/1939 | Lane | 206/56 |
| 2,278,673 | 4/1972 | Savada et al. | 154/43 |
| 2,371,985 | 3/1945 | Freiberg | 206/46 |
| 2,411,328 | 11/1946 | MacNab | 33/12 |
| 2,510,120 | 6/1950 | Leander | 117/112 |
| 2,529,060 | 11/1950 | Trillich | 117/68.5 |
| 2,544,075 | 3/1951 | Ernst et al. | 150/49 |
| 2,621,142 | 12/1952 | Wetherell | 154/117 |
| 2,822,287 | 2/1958 | Avery | 117/14 |
| 2,846,060 | 8/1958 | Yount | 206/58 |
| 2,883,262 | 4/1959 | Borin | 21/56 |
| 3,022,605 | 2/1962 | Reynolds | 47/58 |
| 3,027,263 | 3/1962 | Wanamaker | 99/172 |
| 3,113,712 | 12/1963 | Kindseth | 229/14 |
| 3,121,647 | 2/1964 | Harris et al. | 118/202 |
| 3,130,113 | 4/1964 | Silman | 161/97 |
| 3,148,799 | 9/1964 | Meroney | 220/63 |
| 3,215,330 | 11/1965 | Thomas | 229/14 |
| 3,271,922 | 9/1966 | Wallerstein et al. | 53/3 |
| 3,508,372 | 4/1970 | Wallerstein et al. | 53/3 |
| 3,514,012 | 5/1970 | Martin | 220/63 |
| 3,620,366 | 11/1971 | Parkinson et al. | 206/59 C |
| 3,681,105 | 8/1972 | Milutin et al. | 117/15 |
| 3,757,990 | 9/1973 | Buth | 220/63 R |
| 3,927,821 | 12/1975 | Dunning | 229/14 BL |
| 4,054,697 | 10/1977 | Reed et al. | 428/40 |
| 4,216,620 | 8/1980 | Weder et al. | 47/72 |
| 4,297,811 | 11/1981 | Weder | 47/72 |
| 4,333,267 | 6/1982 | Witte | 47/84 |
| 4,379,101 | 4/1983 | Smith | 264/40.3 |

(List continued on next page.)

OTHER PUBLICATIONS

Exhibit A—"Speed Sheets® And Speed Rolls", Highland Supply Corporation Speed Sheets® Brochure ©1990, 2 pages.

Primary Examiner—Horace M. Culver
Attorney, Agent, or Firm—Dunlap & Codding

[57] ABSTRACT

A decorative material comprising a sheet of material having a colored sticky element disposed upon a portion of a surface of the sheet of material, the colored sticky element comprising at least a portion of a decoration on the sheet of material. The sheet of material is disposed on a surface or wrapped about an item.

17 Claims, 4 Drawing Sheets

U.S. PATENT DOCUMENTS

| | | | |
|---|---|---|---|
| 4,380,564 | 4/1983 | Cancio et al. | 428/167 |
| 4,413,725 | 11/1983 | Bruno et al. | 206/45.33 |
| 4,546,875 | 10/1985 | Zweber | 206/0.82 |
| 4,733,521 | 3/1988 | Weder et al. | 53/580 |
| 4,765,464 | 8/1988 | Ristvedt | 206/0.82 |
| 5,111,638 | 5/1992 | Weder | 53/397 |
| 5,181,364 | 1/1993 | Weder | 53/397 |
| 5,186,988 | 2/1993 | Dixon | 383/37 |
| 5,335,477 | 8/1994 | Weder | 53/462 X |

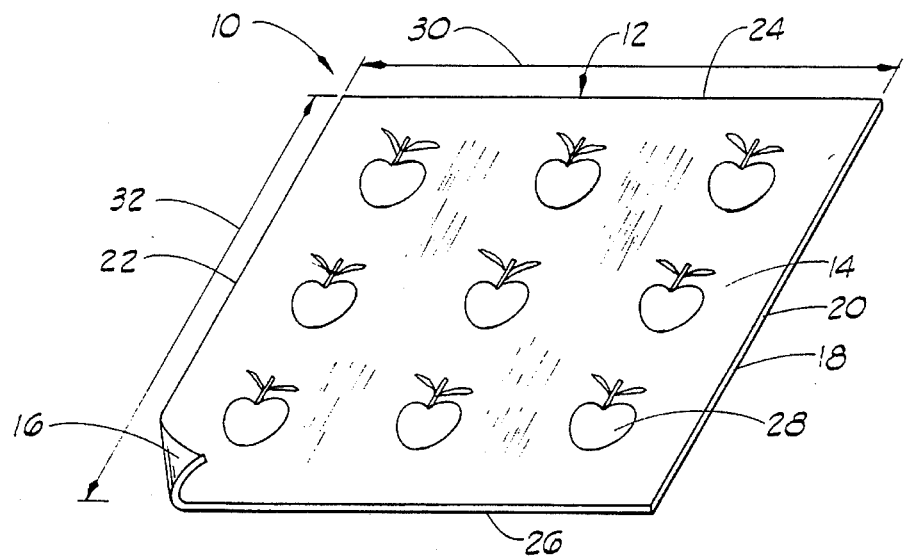
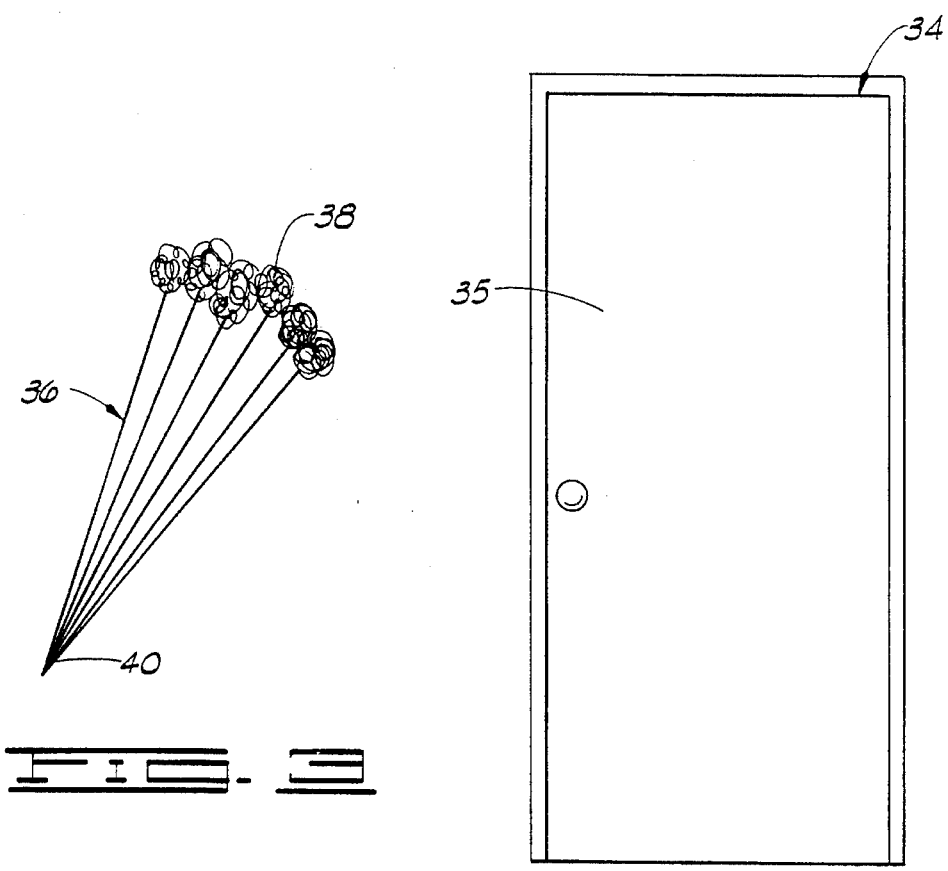

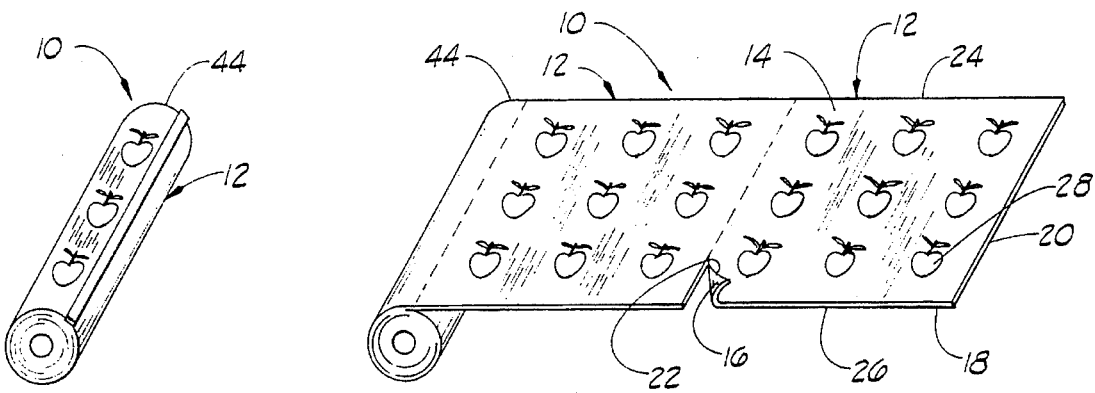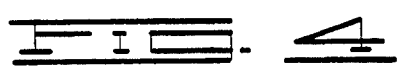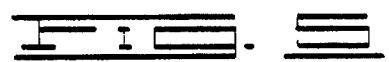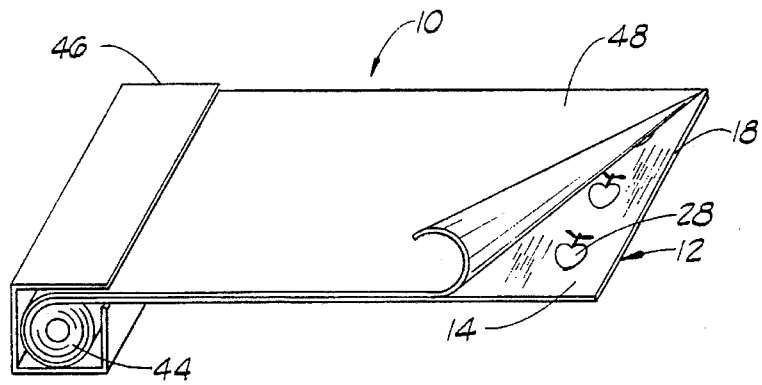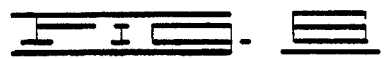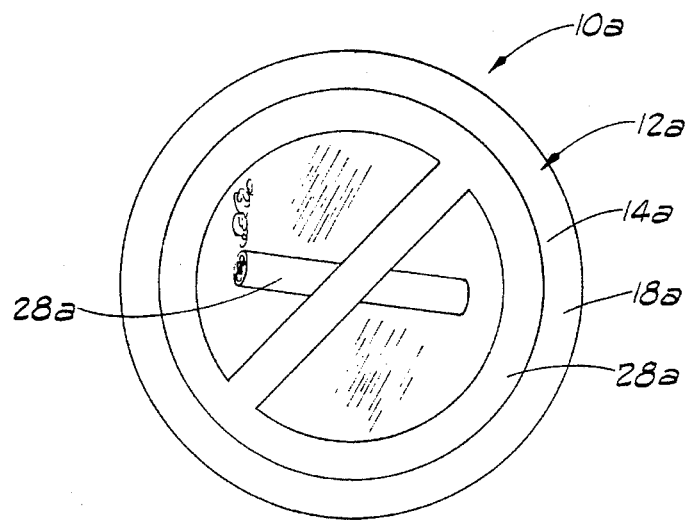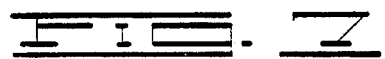

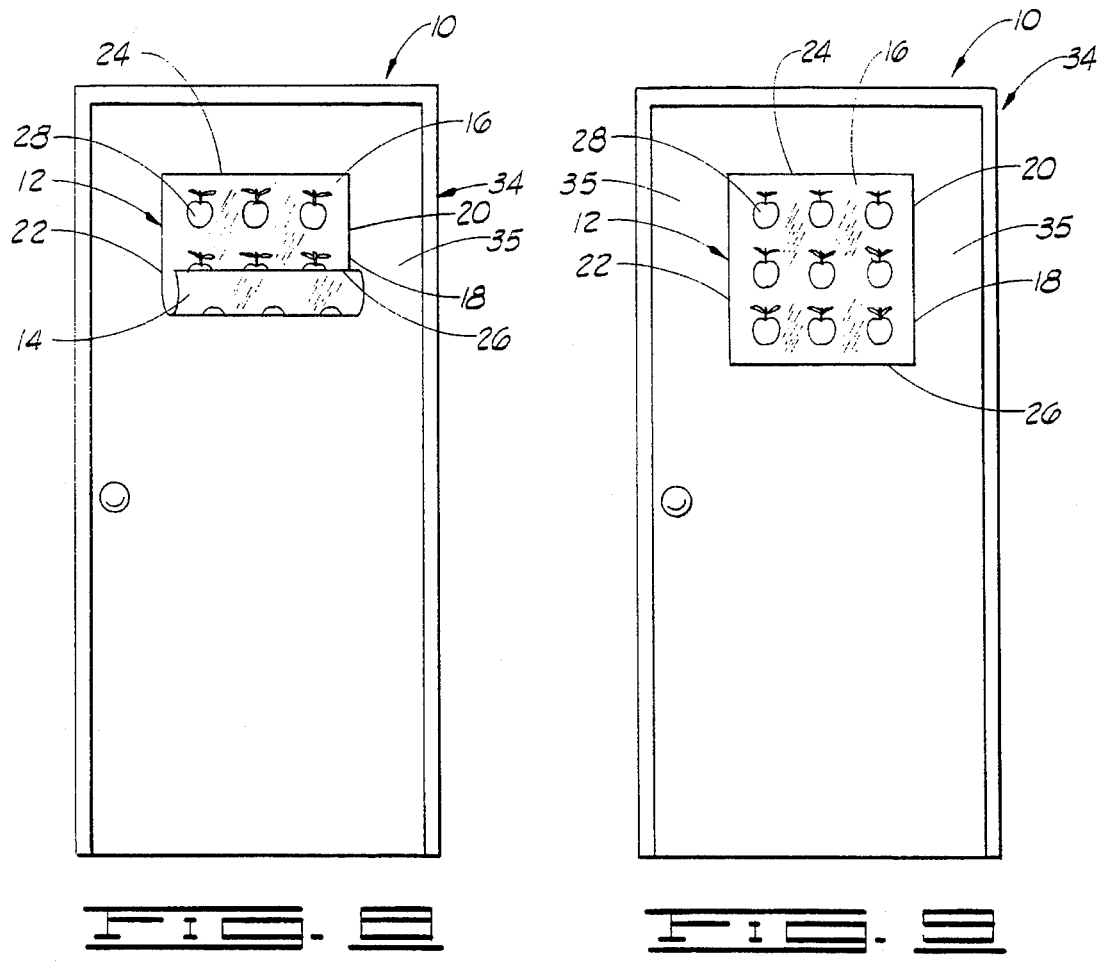
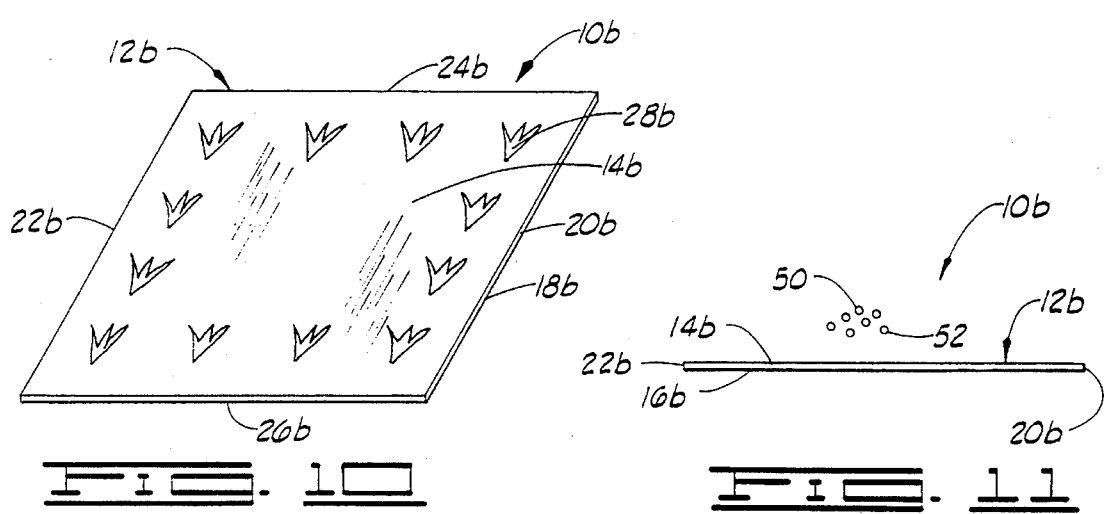

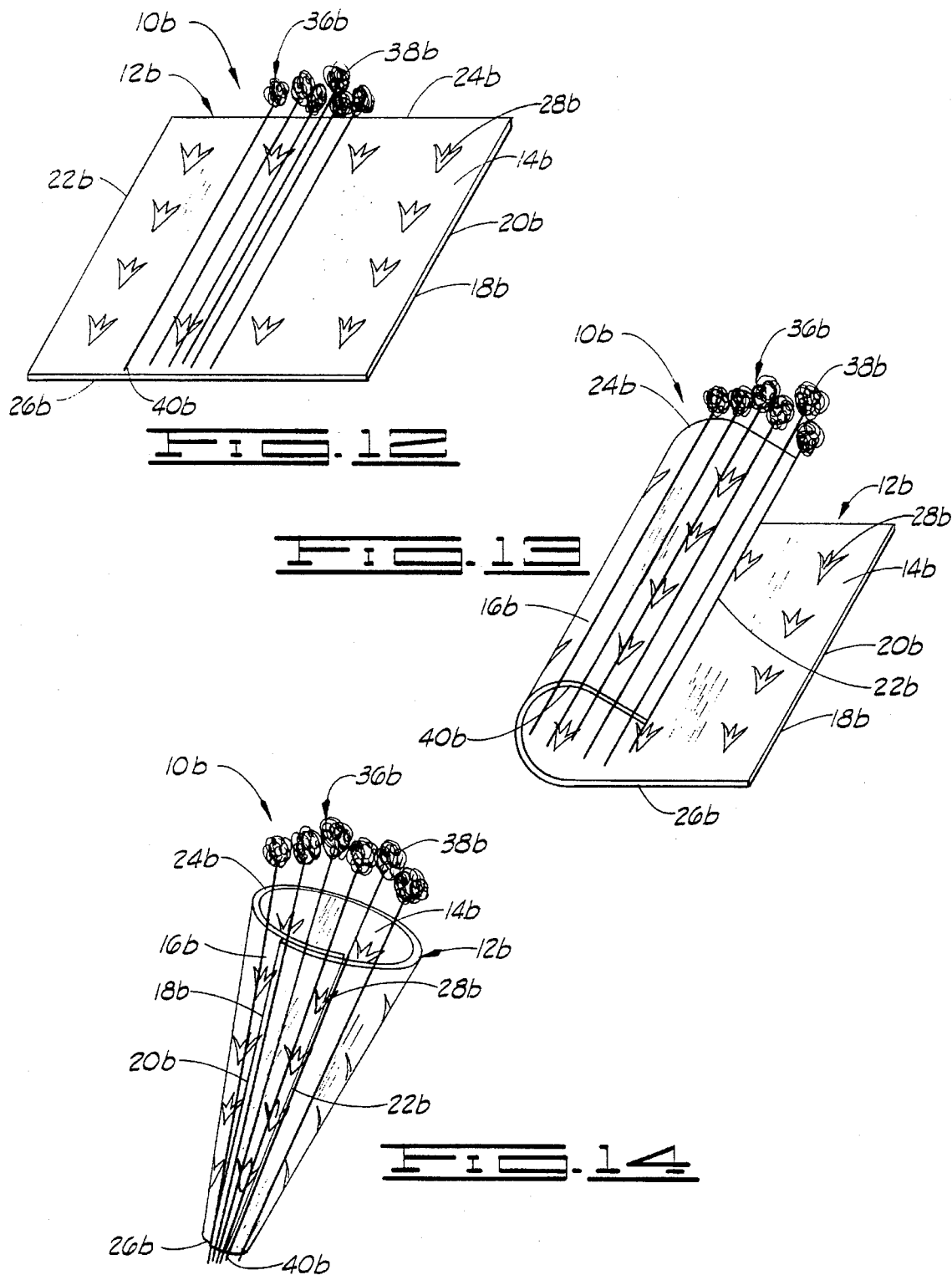

5,482,752

DECORATIVE MATERIAL HAVING A COLORED STICKY ELEMENT DISPOSED THEREON FORMING AT LEAST A PORTION OF A DECORATION

CROSS REFERENCE TO RELATED APPLICATIONS

This application is a divisional of U.S. Ser. No. 07/894,705, filed Jun. 3, 1992, entitled DECORATIVE MATERIAL HAVING A COLORED STICKY ELEMENT DISPOSED THEREON FORMING AT LEAST A PORTION OF A DECORATION AND METHOD, now U.S. Pat. No. 5,347,783 which is a continuation-in-part of U.S. Ser. No. 707,417, filed May 28, 1991, now abandoned, entitled WRAPPING MATERIAL FOR WRAPPING A FLORAL GROUPING WITH SHEETS HAVING ADHESIVE OR COHESIVE MATERIAL APPLIED THERETO, which is a continuation of U.S. Ser. No. 502,358, filed Mar. 29, 1990, now abandoned, entitled WRAPPING A FLORAL GROUPING WITH SHEETS HAVING ADHESIVE OR COHESIVE MATERIAL APPLIED THERETO, which is a continuation-in-part of U.S. Ser. No. 391,463, filed Aug. 9, 1989, now abandoned, entitled ADHESIVE APPLICATOR, which is a continuation-in-part of U.S. Ser. No. 249,761, filed Sep. 26, 1988, now abandoned, entitled METHOD FOR WRAPPING AN OBJECT IN A MATERIAL HAVING PRESSURE SENSITIVE ADHESIVE THEREON, which is a continuation-in-part of U.S. Ser. No. 219,083, filed Jul. 13, 1988, entitled ARTICLE FORMING SYSTEM, now U.S. Pat. No. 4,897,031, which is a continuation of U.S. Ser. No. 004,275, filed Jan. 5, 1987, entitled ARTICLE FORMING SYSTEM, now U.S. Pat. No. 4,773,182, which is a continuation of U.S. Ser. No. 613,080, filed May 22, 1984, entitled ARTICLE FORMING SYSTEM, now abandoned.

FIELD OF THE INVENTION

The present invention relates generally to decorative materials having a colored sticky element disposed thereon, said colored sticky elements forming at least a portion of a decoration on the material and methods of using same.

BRIEF DESCRIPTION OF THE DRAWINGS

FIG. 1 is a perspective view of the sheet of material of the present invention, showing the upper surface, the colored sticky element design being disposed thereon.

FIG. 2 is a side elevational view of a surface, the surface being a door.

FIG. 3 is a perspective view of a floral arrangement.

FIG. 4 is a perspective view of a plurality of sheets of material constructed in accordance with the present invention forming a continuous roll of material.

FIG. 5 is a perspective view of a plurality of sheets of material constructed in accordance with the present invention forming a continuous roll, showing one sheet of material partially detached.

FIG. 6 is a perspective view of a plurality of sheets of material constructed in accordance with the present invention forming a continuous roll of material disposed in a dispenser, showing a release sheet partially detached from the upper surface of a sheet of material.

FIG. 7 is a perspective view of another embodiment of the sheet of material of the present invention, showing the upper surface, the colored sticky element design being disposed on the lower surface.

FIG. 8 is a side elevational view of the sheet of material of the present invention, showing the method of applying the sheet of material to a surface.

FIG. 9 is a side elevational view of the sheet of material of the present invention, showing the sheet of material connected to a surface.

FIG. 10 is a perspective view of another embodiment of the sheet of material of the present invention, showing the upper surface, the colored sticky element design being disposed thereon.

FIG. 11 is a perspective view of the sheet of material of the present invention, showing the method of disposing a floral arrangement thereon.

FIG. 12 is a perspective view of the sheet of material of the present invention, showing a floral arrangement disposed thereon.

FIG. 13 is a perspective view of the sheet of material of the present invention, showing the method of wrapping a floral arrangement.

FIG. 14 is a perspective view of the sheet of material of the present invention, showing a floral arrangement wrapped.

DESCRIPTION OF THE PREFERRED EMBODIMENTS

The present invention comprises a decorative material having a colored sticky element thereon, the colored sticky element forming at least a portion of a decoration upon the material. The decorative material is separated into single sheets of material. Such a sheet of material may be decorated, for example, with a halloween pumpkin design, a snow flake design, or a Santa Claus design (each decorative design made partially or totally from the colored sticky element), and the sheet of material may be placed on a window, or other surface, as described below. The sheet of material in such an instance is at least partially transparent or translucent, in order for the design to be perceived from both outside of the window as well as inside. Alternatively, the sheet of material may be a solid or opaque color, which would limit the view of the design, for instance, to just one side of the window.

The present invention, as described herein, may be used to provide holiday decorations. Or, the invention may be used as disposable or non-permanent signs, such as a "no-smoking" sign, hallway signs, and the like. In addition, the decorative material of the present invention may be utilized to wrap an item, the item comprising a floral arrangement. In all of the above referenced embodiments, the decorative material of the present invention permits the colored sticky element to be "hidden," because the colored sticky element is either a part of the overall decoration, or comprises the overall decoration. Therefore, the integrity and continuity of the decorations on the decorative material is maintained, and not marred by the unsightly appearance of sticky elements, such as either adhesives or cohesives.

The Embodiments of FIGS. 1–6

Referring now to FIG. 1, designated generally by the reference numeral 10 is a decorative material constructed in accordance with the present invention. "Decorative material," as used herein, means a material having decorations thereon, the decorations comprising one or more designs. "Designs," which comprise the decoration, are defined as any geometric form, or any combination of geometric forms, for example, squares, round spots, triangles, rectangles, octagonals, or the like (not shown). The designs are further defined as any non-geometric, asymmetrical or fanciful forms, or any combination thereof, for example, hearts, balloons, flowers, lace, slogans, logos, print (any combination of letters and/or numbers), signs, human forms (real and fictional) animal forms (real and fictional), cartoons characters, plant forms, (such as the "apple" design shown schematically in FIGS. 1, 4–6, and 8–9), and the like. The designs in the decorations comprise one or more colors.

The decorative material 10 comprises a sheet of material 12. The sheet of material 12 comprises an upper surface 14, a lower surface 16, and an outer periphery 18 (an edge of which is lifted for illustration purposes only). The outer periphery 18 of the sheet of material 12 further comprises a first side 20, a second side 22, a third side 24, and fourth side 26.

The decorations upon the decorative material are at least partially formed by colored sticky elements 28. That is, the colored sticky elements 28 comprise at least a portion of a decoration on the sheet of material 12. In a preferred embodiment, the colored sticky elements 28 comprise at least one design, the design comprising at least one decoration (therefore, the colored sticky elements 28 will be also be referred to herein as "colored sticky element designs"). As illustrated in FIG. 1, the colored sticky elements 28 comprise a plurality of "apple" designs (only one of the colored sticky elements 28 is designated). "Colored sticky element," as used herein, means an adhesive, or a cohesive, having disposed therein a color. "Color" means ink, dye, pigment, or any combination thereof of any color or combination of colors thereof which is mixed with an adhesive, or a cohesive, to create a colored sticky element. It will be appreciated that a decoration, or any portion thereof, not comprising a colored sticky element 28 will comprise a "color", as defined above, which is printed, embossed, etched,, heat sealed, or disposed by any method described herein or commonly used in the art, upon the sheet of material 12.

In the embodiment of FIG. 1, the sheet of material 12 is square. In the embodiment of FIG. 7, however, the sheet of material 12a is round. It will be appreciated, therefore, that any shape or size of sheet of material 12 may be used. For example, the sheet of material 12 may also comprise other shapes, i.e., rectangular, triangular, oval, octagonal, asymmetrical, or the like. And multiple sheets of material 12 may be used. Moreover, when multiple sheets of material 12 are used in combination, the sheets of material 12 need not be uniform in size or shape. Finally, it will be appreciated that each sheet of material 12 shown herein is substantially flat.

The sheet of material 12 may be constructed of a single sheet of material or a plurality of sheets of material. Any thickness of the sheet of material 12 may be utilized in accordance with the present invention as long as the sheet of material 12 may be disposed upon a surface or wrapped about at least a portion of an item, as described below. The sheet of material 12 has a thickness of less than about 1 mil to about 30 mils. Typically, the sheet of material 12 has a thickness in a range of less than about 0.2 mils to about 10 mils. In a preferred embodiment, the sheet of material 12 is constructed from one sheet of man-made organic polymer film having a thickness in a range of from less than about 0.5 mils to about 2.5 mils.

The sheet of material 12 is constructed from any suitable material that is capable of being disposed upon a surface or wrapped about an item. Preferably, the decorative material 10 comprises paper (untreated or treated in any manner), cellophane, foil, man-made organic polymer film, fiber (woven or nonwoven or synthetic or natural), burlap, or combinations thereof.

The term "man-made organic polymer film" means a man-made resin such as a polypropylene as opposed to naturally occurring resins such as cellophane. A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral arrangement.

Additionally, a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention. For example, one such man-made organic polymer film is a polypropylene film.

Referring to FIG. 1, the sheet of material 12 may vary in color. Further, the sheet of material 12 may consist of designs which are at least partially printed, etched, and/or embossed thereon; in addition, the sheet of material 12 may have various colorings, coatings, flocking and/or metallic finishes, or be characterized totally or partially by pearlescent, translucent, transparent, opaque, or the like, qualities. Each of the above-named characteristics may occur alone or in combination. Moreover, each surface of the sheet of material 12 may vary in the combination of such characteristics.

Each sheet of material 12 has a width 30 (FIG. 1) extending generally between the first and the second sides 20 and 22, respectively, sufficiently sized whereby each sheet of material 12 can be disposed upon a surface or wrapped about and encompass an item. Each sheet of material 12 has a length 32 (FIG. 1) extending generally between the third and the fourth sides 24 and 26, respectively, sufficiently sized whereby the sheet of material 12 extends over a substantial portion of a surface or an item when the sheet of material 12 is disposed on a surface or wrapped about an item, in accordance with the present invention, as explained further below.

The "surface" contemplated in the present invention is defined as a surface 34 wherein at least a portion of the surface 34 is a flat plane 35. An example of such a surface 34 is shown in FIG. 2, wherein the surface 34 comprises a door, a portion of the door comprising a flat plane 35. Such a surface 34 must also be suitable for receiving a sheet of material 12 thereupon. "Suitable for receiving" is defined as a substantially dry surface which has only minimal to moderate texturing thereupon. Examples of such surfaces include walls, windows, doors, the surface of tables, chairs, pieces of furniture, appliances, and the like.

The item contemplated for wrapping by the decorative material described herein is a floral arrangement 36, and one such floral arrangement is shown in FIG. 3. "Floral arrangement" as used herein means cut fresh flowers, artificial flowers, other fresh and/or artificial plants or other floral materials and may include other secondary plants and/or ornamentation which add to the aesthetics of the overall floral arrangement 36. The floral arrangement 36 comprises an upper end consisting of a bloom, foliage or flower portion 38 and a lower end consisting of a stem portion 40. However, it will be appreciated that the floral arrangement 36 may consist of only a single bloom 38 or only foliage 38 (not shown).

Referring to FIG. 1, the colored sticky element 28 may be disposed on the upper surface 14 of the sheet of material 12. In FIG. 7, however, the colored sticky element 28 is disposed on the lower surface 16a of the sheet of material 12a. It will be appreciated that the colored sticky element 28 may also be disposed on at least a portion of both the upper surface 14 and the lower surface 16 of the sheet of material 12 (not shown).

Any transparent section of the sheet of material 12 is preferably constructed from man-made polymers, or from cellophane, or from a combination thereof. In a preferred embodiment, as illustrated in FIG. 1, the sheet of material 12 comprises at least one transparent section, and colored sticky element designs 28 comprise all of the decoration upon the sheet of material 12. In the preferred embodiment, the colored sticky element designs 28 are viewable through a portion of both the upper surface 14 and the lower surface 16 of the sheet of material 12.

The colored sticky element designs 28 are disposed on at least one surface of the sheet of material 12 by spraying them thereupon, painting them thereupon, lacquering them thereupon, or by any method known in the art which would effectively dispose the colored sticky element designs 28 on the sheet of material 12 of the present invention. The adhesive or cohesive used in the colored sticky element designs 28 defined herein may be any one of those where the adhesive, or cohesive, permits an adhesive connection, or cohesive connection, respectively, and a releasable connection between portions of a sheet of material 12, between the colored sticky element designs 28 and the surface 34, or between the colored sticky element designs 28 and an item comprising a floral arrangement 36. Such adhesives are known in the art and commercially available. Similarly, such cohesives are also known in the art and commercially available.

The colored sticky element designs 28 may comprise a continuous design which extends from one side of the sheet of material 12 to another side of the sheet of material 12, or the colored sticky element designs 28 may comprise a plurality of detached, separate designs disposed over the sheet of material. A combination of colored sticky element designs 28, comprising a continuous design disposed on the surface of the material 12 with detached, separate designs superimposed and disposed thereover may be utilized. Each colored sticky element design 28 comprising either a continuous design or a plurality of detached, separate designs, or a combination thereof, may be disposed upon the sheet of material 12 in a symmetrical or asymmetrical manner.

In FIG. 1, the colored sticky element designs 28 disposed upon the upper surface 14 of the sheet of material 12 have a thickness of less than about 1 mil to about 30 mils. Typically, the colored sticky element designs 28 will have a thickness in a range of less than about 0.2 mils to about 10 mils. In a preferred embodiment, the colored sticky element designs 28 have a thickness in a range of from less than about 0.5 mils to about 2.5 mils.

In a preferred embodiment, illustrated in FIG. 1, the colored sticky element designs 28 are disposed on the upper surface 14 of the sheet of material 12, and are observed through the transparent sheet of material 12, as shown in FIGS. 8 and 9. Alternatively, the colored sticky element designs 28 are disposed upon and extend over a substantial portion of the lower surface 16 of the sheet of material 12 (FIG. 7). In another alternative embodiment, previously described, the colored sticky element designs 28 are disposed upon both the upper surface 28 and the lower surface 16 of the sheet of material 12 (not shown).

The decorative material 10 may comprise separate sheets of material 12, as illustrated in FIGS. 1, 7 and 10, or the decorative material 10 may comprise a plurality of sheets of material 12 connected together to form a roll 44, as shown in FIGS. 4 and 5. Preferably, the plurality of sheets of material 12 in the roll 44 are connected by perforations, as shown FIG. 5. Such a roll 44 permits one sheet of material 12 to be withdrawn from the roll 44 (one sheet 12 shown partially detached, for illustration purposes only), the sheet of material 12 being severed from the roll 44. Alternatively, the roll 44 may simply be formed as a continuous roll 44 of decorative material 10 without perforations, wherein a plurality of sheets of material 12 may be withdrawn from the roll 44 by unrolling a portion of the decorative material 10 from the roll 44, and using a separate cutting element (not shown) to sever the unrolled portion of the decorative material 10 from the roll 44 to form the sheet of material (not shown). The roll 44 may also be contained within a dispenser 46, as illustrated in FIG. 6. When the roll 44 is disposed in the dispenser 46, a portion of the decorative material 10 is again unrolled, and a serrated cutting edge (not shown) contained within the dispenser 46, or a separate cutting element (not shown) severs the unrolled portion of the decorative material 10 from the roll to form a sheet of material 12. Any number of sheets of material 12 may form the roll 44 as long as it is possible to withdraw at least one sheet 12 from the roll 44 as described herein. A release strip 48 may cover a surface of a single sheet of material 12, or all of the decorative material 10 contained within the roll 44, as shown in FIG. 6 (a portion of the release strip 48 shown partially detached from the sheet of material 12 for illustration purposes only). It will be appreciated that the release strip 48 covers a surface of the sheet of material 12 having colored sticky element designs 28 thereon to protect the adhesive or cohesive qualities of the colored sticky element designs 28, and when a sheet of material 12 is severed from the roll 44, the release sheet 48 is simultaneously also severed from the roll 44. The release sheet 48 is releasably removed from the sheet of material 12 before the sheet of material 12 is disposed upon a surface 34 or wrapped about an item comprising a floral arrangement 36.

The Embodiment of FIG. 7

Shown in FIG. 7 is a modified sheet of material 12a which is constructed exactly like the sheet of material 12 shown in FIGS. 1–6 and described in detail previously, except that each sheet of material 12a is round, the colored sticky element design 28a is disposed on the lower surface 16a of the sheet of material 12a, and the decoration comprises a no-smoking design. The method of use is exactly the same as that described below for the sheet of material 12. In an alternative method, a colorless cohesive would be disposed first upon a surface (not shown) and then the sheet of material 12a would be disposed on the surface having the cohesive disposed thereon, as described below (not shown).

The Method of FIGS. 8–9

In a general method of use of the embodiments illustrated in FIGS. 1–2 and 4–6, a sheet of material 12 and a surface 34 (a door), as previously described, are provided. An operator detaches a sheet of material 12 from a roll 44 containing the decorative material 10 by any method described herein (not shown). Referring now to FIG. 8, the operator disposes a portion of the sheet of material 12 upon the surface 34, the colored sticky elements 28 disposed on a portion of the upper surface 14 of the sheet of material 12 being disposed adjacent the surface 34 and contactingly engaging the surface 34, the colored sticky elements 28 engaging the surface 34 such that the portion of the sheet of material 12 disposed against the surface 34 is connected to the surface 34. As illustrated in FIGS. 8–9, the operator continues to dispose the remaining, un-connected portions of the sheet of material 12 upon the surface 34, until substantially all the colored sticky elements 28 on the upper surface 14 of the sheet of material 12 are disposed adjacent the surface 34, the colored sticky elements on the sheet of material 12 contactingly engaging the surface 34, thereby substantially connecting the sheet of material 12 to the surface 34, the sheet of material 12 substantially conforming to the contours of the surface 34.

It will be appreciated that, in an alternate method, a colored sticky element 28 is first disposed upon the surface 34 (prior to disposing the sheet of material 12 upon the surface 34). The colored sticky element 28 on the surface 36 and the colored sticky element 28 on the sheet of material 12 contacting and connecting the sheet of material 12 to the surface 36, as described herein.

The Embodiment of FIG. 10

Shown in FIG. 10 is a modified sheet of material 12b which is constructed exactly like the sheet of material 12 shown in FIGS. 1–6 and described in detail previously, except that each sheet of material 12b has a plurality of "fleur de lis" colored sticky element designs 28b disposed thereon.

The Method of FIGS. 10–14

FIGS. 10–14 illustrate a method of wrapping an item with a sheet of material 12b, the item comprising a floral arrangement 36b. A sheet of material 12b and a floral arrangement 36b, as previously described, are provided. An operator detaches the sheet of material 12b from a roll 44 containing the decorative material 10 by any method described herein (not shown).

Referring now to FIG. 10, the operator disposes the sheet of material 12b on a substantially horizontal surface 34b (not shown), the lower surface 16b of the sheet of material 12b being disposed adjacent the surface 34b. The operator then prepares to dispose a floral arrangement 36b on the upper surface 14b of the sheet of material 12b, preferably toward the center of the sheet of material 12b, as shown in FIG. 11. The portion of the floral arrangement 36b not touching the sheet of material is the top portion 50 and the portion of the floral arrangement 36b which touches the sheet of material 12b is the lower portion 52, as illustrated in FIGS. 11–12. Referring now to FIGS. 12–14, the operator then wraps the sheet of material 12b about the floral arrangement 36b by overlapping a portion of the sheet of material 12b over another portion of the sheet of material 12b. That is, for instance, the operator places the second side 22b of the sheet of material 12b over the top portion 50 of the floral arrangement 36b, the lower portion 52 of the floral arrangement 36b lying against and contacting the sheet of material 12b (FIGS. 11–12), then the operator places the first side 20b of the sheet of material 12b over the second side 22b of the sheet of material 12b, the first side 20b overlapping the second side 22b. The operator bonds the overlapping portions of the sheet of material 12b together by contacting the colored sticky element designs 28b on each overlapping portion of the sheet of material 12b with a corresponding adjacent portion of the sheet of material 12b (near the first side 20b of the sheet of material 12b and near the second side 22b of the sheet of material 12b, respectively), wherein the colored sticky element designs 28b on the sheet of material 12b contact the sheet of material 12b to connect the overlapping portions of the sheet of material 12b, the connected sheet of material 12b substantially encompassing and surrounding a substantial portion of the floral arrangement 36b.

Changes may be made in the embodiments of the invention described herein or in parts or elements of the embodiments described herein or in the steps or in the sequences of steps of the methods described herein without departing from the spirit and scope of the invention as defined in the following claims.

What is claimed is:

1. A decorative material, comprising:
   a sheet of material having an upper surface, a lower surface, and an outer periphery, a colored sticky element being disposed upon at least a portion of at least one surface of the sheet of material, the colored sticky element comprising at least a portion of a decoration on the sheet of material, the colored sticky element blending with the decoration thereby hiding the bonding characteristics of the colored sticky element.

2. The decorative material of claim 1 wherein the colored sticky element is viewable through a portion of both the upper surface and the lower surface of the sheet of material.

3. The decorative material of claim 1 wherein the colored sticky element comprises a color.

4. The decorative material of claim 1 wherein the colored sticky element comprises a decoration.

5. The decorative material of claim 1 wherein the sheet of material is constructed from the group of materials consisting of paper (treated or untreated), cellophane, foil, polymer film, fiber (woven or nonwoven or natural or synthetic), burlap, or any combination thereof.

6. The decorative material of claim 1 wherein at least a portion of the sheet of material is transparent.

7. The decorative material of claim 1 wherein at least a portion of the sheet of material is translucent.

8. The decorative material of claim 1 wherein at least a portion of the material comprises polymer film.

9. The decorative material of claim 1 wherein at least a portion of the material comprises cellophane.

10. The decorative material of claim 1 wherein the surface upon which the colored sticky element is disposed upon is selected from the group consisting of the upper surface of the sheet of material, the lower surface of the sheet of material, and both the upper surface and the lower surface of the sheet of material.

11. The decorative material of claim 1 wherein the periphery further comprises a first side, a second side, a third side, and a fourth side.

12. The decorative material of claim 1 wherein the sheet of material has a thickness in a range from less than 1 mil to about 30 mils.

13. The decorative material of claim 1 wherein the colored sticky element has a thickness in a range from less than 1 mil to about 30 mils.

14. The decorative material of claim 1 wherein the sheet of material comprises a thickness in a range of less than about 0.2 mils to about 10 mils.

15. The decorative material of claim 1 wherein the sheet of material comprises a thickness in a range of less than about 0.5 mils to about 2.5 mils.

16. The decorative material of claim 1 wherein the colored sticky element comprises an adhesive.

17. The decorative material of claim 1 wherein the colored sticky element comprises a cohesive.

\* \* \* \* \*

UNITED STATES PATENT AND TRADEMARK OFFICE
CERTIFICATE OF CORRECTION

PATENT NO. : 5,482,752                    Page 1 of 2
DATED : January 9, 1996
INVENTOR(S) : Donald E. Weder It is certified that error appears in the above-identified patent and that said Letters Patent is hereby corrected as shown below:

On title page, under 'References Cited', after "2,278,673", please delete "4/1972", and substitute therefore --4/1942--.

Column 1, lines 13-14, please delete "5,347,783", and substitute therefore --5,347,789--.

Column 1, lines 15-16, please delete "WRAPPING MATERIAL FOR--.

Column 1, line 24, after 'APPLICATOR', please insert --DISPENSER--.

Column 5, line 9, please delete "28", and substitute therefore --28a--.

Column 7, line 21, please delete "36", and substitute therefore --34--.

UNITED STATES PATENT AND TRADEMARK OFFICE
CERTIFICATE OF CORRECTION

PATENT NO. : 5.482,752

DATED : January 9, 1996

INVENTOR(S) : Donald E. Weder

It is certified that error appears in the above-indentified patent and that said Letters Patent is hereby corrected as shown below:

Column 7, line 24, please delete "36", and substitute therefore --34--.

Signed and Sealed this

Twenty-eighth Day of May, 1996

Attest:

BRUCE LEHMAN

*Attesting Officer*    *Commissioner of Patents and Trademarks*